(12) United States Patent
Yu et al.

(10) Patent No.: US 8,376,296 B2
(45) Date of Patent: Feb. 19, 2013

(54) MOUNTING APPARATUS FOR DISK DRIVE

(75) Inventors: Xiang Yu, Shenzhen (CN); Xiao-Yong Ma, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/329,807

(22) Filed: Dec. 19, 2011

(65) Prior Publication Data

US 2012/0223204 A1 Sep. 6, 2012

(30) Foreign Application Priority Data

Mar. 4, 2011 (CN) .......................... 2011 1 0052343

(51) Int. Cl.
*A47B 96/06* (2006.01)
*A47F 5/00* (2006.01)
*A47F 5/08* (2006.01)
*G12B 9/00* (2006.01)
*A47H 1/10* (2006.01)
*E04G 3/00* (2006.01)
*H05K 5/00* (2006.01)
*H05K 7/00* (2006.01)

(52) U.S. Cl. ................. 248/213.2; 248/291.1; 248/27.1; 248/205.1; 361/679.33; 361/679.37

(58) Field of Classification Search ................. 248/500, 248/505, 506, 200, 205.1, 213.2, 291.1, 27.1, 248/220.21, 220.22, 221.11, 222.11, 222.52; 361/679.01, 679.02, 752, 679.32–679.39, 361/679.55–679.58, 724–727; 312/223.1–223.2
See application file for complete search history.

(56) References Cited

U.S. PATENT DOCUMENTS

| 6,722,618 B1 * | 4/2004 | Wu ............................... 248/166 |
| 2010/0127145 A1 * | 5/2010 | Chen et al. ................. 248/309.1 |

* cited by examiner

*Primary Examiner* — Jonathan Liu
*Assistant Examiner* — Muhammad Ijaz
(74) *Attorney, Agent, or Firm* — Altis Law Group, Inc.

(57) ABSTRACT

A mounting apparatus includes a bracket receiving a disk drive, a locking member and a first resilient member. The bracket includes two first sidewalls and two second sidewalls. Each first sidewall is connected to the two second sidewalls and defines a number of through holes. The locking member includes two frames rotatably secured to the two first sidewalls. Each frame includes a number of pins. The first resilient member is connected to the two frames. Each frame is rotatable between a first position, where the pins are inserted in the bracket via the through holes, and a second position, where the pins are located out of the bracket. The first resilient member is deformed when each frame is rotated from the first position to the second position, and each frame is rotated from the second position to the first position when the first resilient member returns.

20 Claims, 5 Drawing Sheets

MOUNTING APPARATUS FOR DISK DRIVE

BACKGROUND

1. Technical Field

The present disclosure relates to mounting apparatuses, and more particularly to a mounting apparatus for a disk drive.

2. Description of Related Art

Many disk drives are secured in a drive bracket. The drive bracket defines a number of through holes, and each disk drive defines a number of fixing holes. In assembly, the disk drive is inserted in the drive bracket, and the fixing holes are aligned with the through holes. A number of screws are secured into the fixing holes through the through holes, to secure the disk drive to the drive bracket, which is very inconvenient. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
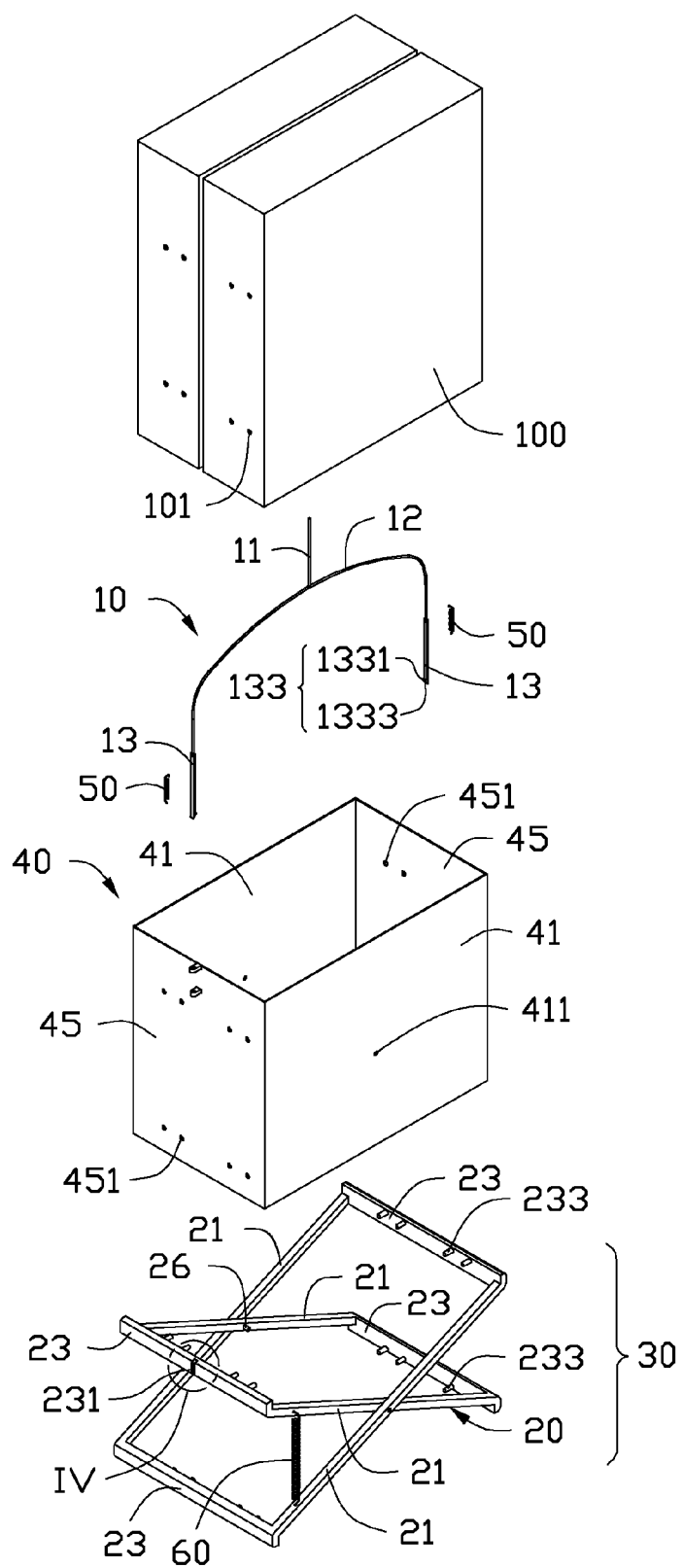
FIG. 1 is an exploded, isometric view of a mounting apparatus and two disk drives in accordance with an embodiment.

Referring to FIG. 1, a mounting apparatus in accordance with an embodiment includes a bracket 40 and a locking member 30.

Figure 3:
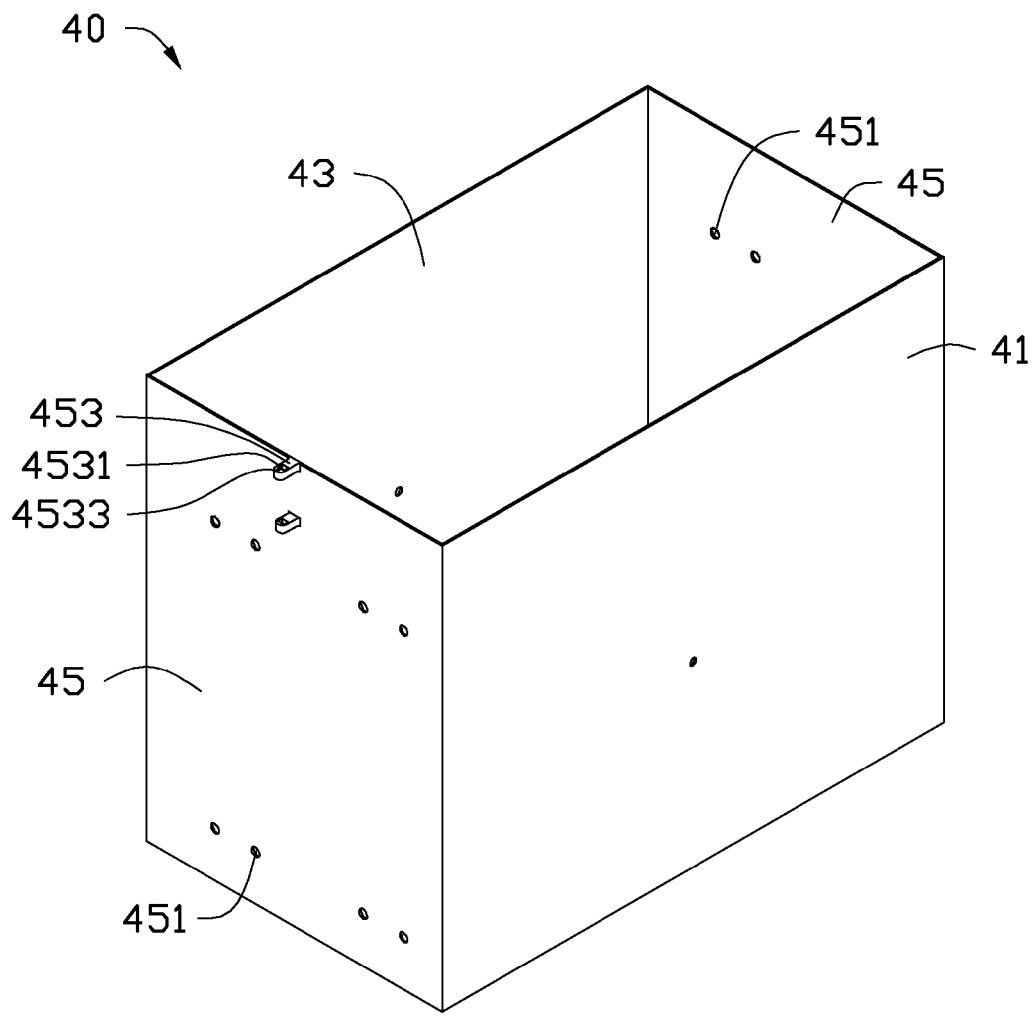
FIG. 3 is an isometric view of a bracket of the mounting apparatus of FIG. 1.

The bracket 40 receives two disk drives 100. The disk drives 100 may be hard disk drives, compact disc read-only memory drives, floppy disk drives, for example. Each disk drive 100 defines a plurality of securing holes 101 in opposite side plates. The bracket 40 includes two first sidewalls 41 and two second sidewalls 45. Each of the first sidewalls 41 is connected to the two second sidewalls 45. In an embodiment, the two first sidewalls 41 are substantially parallel to each other and perpendicular to the two second sidewalls 45. Each of the first sidewall 41 defines a pivot hole 411. Each of the second sidewalls 45 defines a plurality of through holes 451. Referring to FIG. 3, each of the two second sidewalls 45 includes two mounting portions 453. Each of the two mounting portions 453 defines a receiving hole 4531. One of the two mounting portions 453 further defines a mounting hole 4533.

Figure 4:
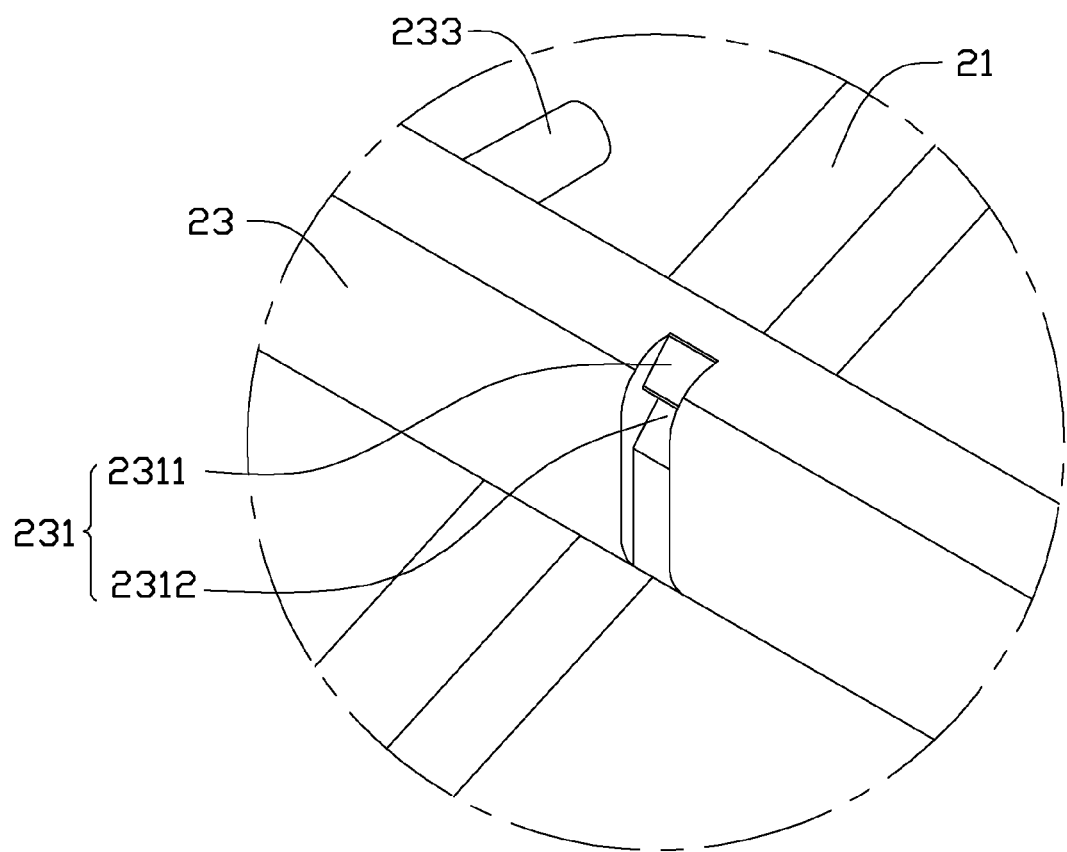
FIG. 4 is an enlarged view of a circled portion IV of FIG. 1.

The locking member 30 includes two frames 20 rotatably secured to each other. Each of the two frames 20 includes two first levers 21 and two second levers 23. Each of the two second levers 23 is connected to the two first levers 21. In an embodiment, the two second levers 23 are substantially parallel to each other and perpendicular to the two first levers 21. A plurality of pins 233 extends from each of the two second levers 23. The locking member 30 further includes two shafts 26. The two shafts 26 are secured to the first levers 21 of the two frames 20, and the first levers 21 are rotatable about the shafts 26. Referring to FIG. 4, one of the two second levers 23 of each frame 20 includes a latching portion 231. The latching portion 231 includes a latch 2311 and a recess 2312 located below the latch 2311.

The locking member 30 further includes a first resilient member 60. The first resilient member 60 is connected to the two frames 20.

Figure 2:
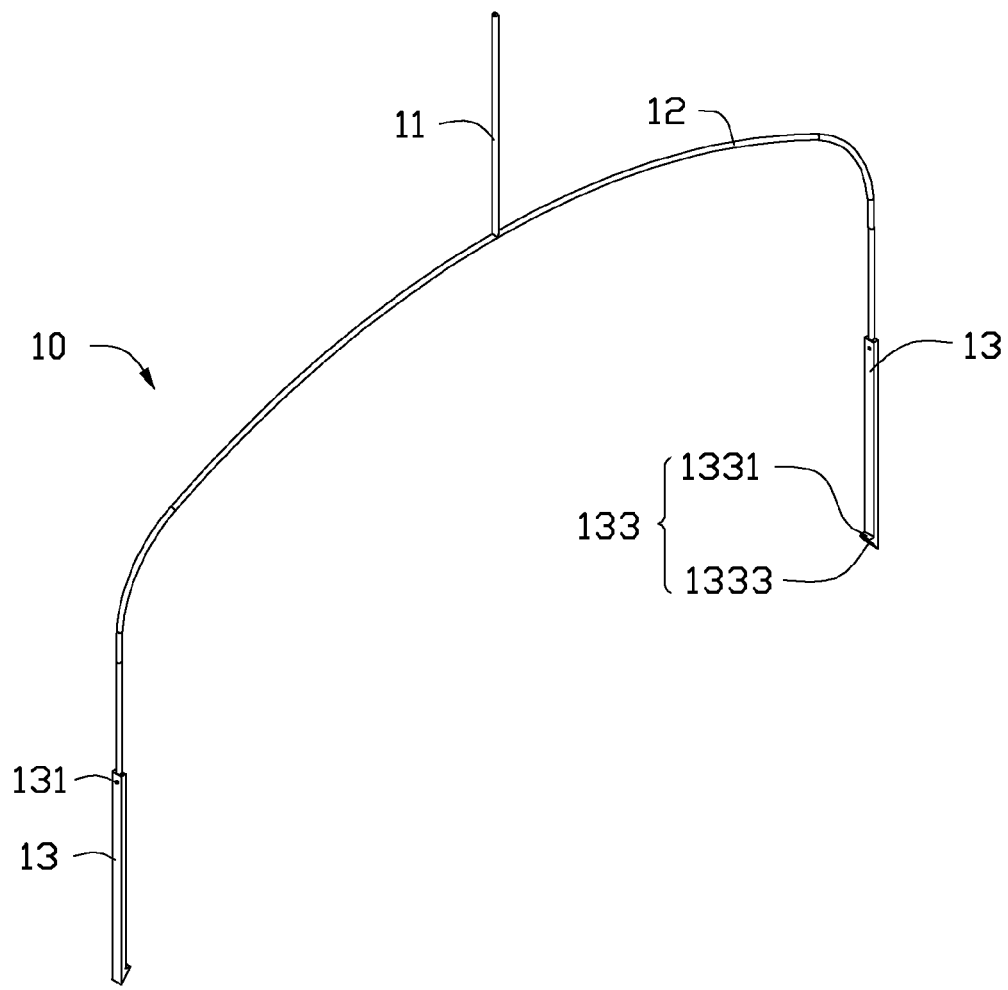
FIG. 2 is an isometric view of an operating member of the mounting apparatus of FIG. 1.

The mounting apparatus further includes two second resilient members 50 and an operating member 10 engaging with the two frames 20. The operating member 10 includes two sliding portions 13, a connecting portion 12 and a handgrip 11. The connecting portion 12 is connected to the two sliding portions 13. The handgrip 11 extends from the connecting portion 12. Referring to FIG. 2, each of the two sliding portion 13 defines a fixing hole 131 and includes a hook 133. The hook 133 includes a blocking surface 1331 and a guide surface 1333.

Figure 5:
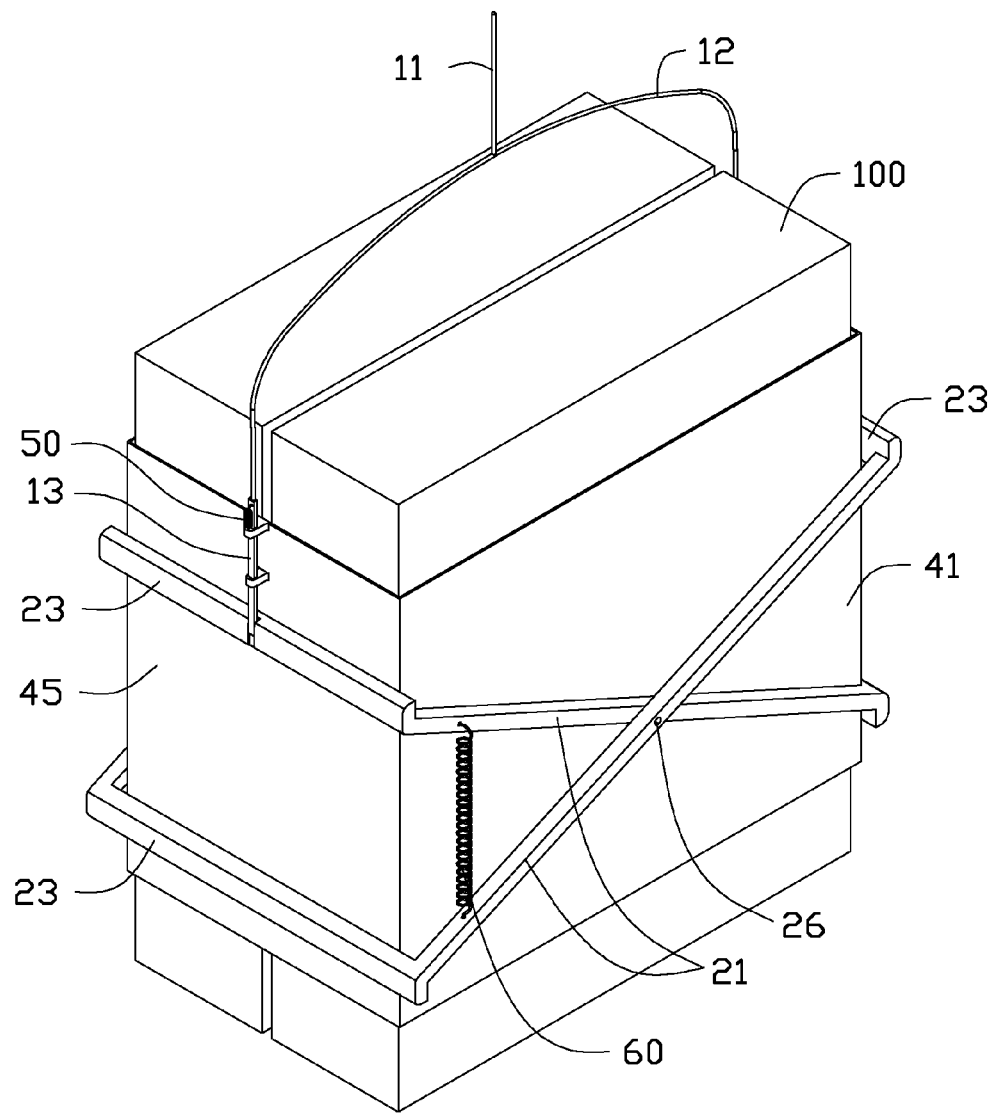
FIG. 5 is an assembled view of FIG. 1

Referring to FIGS. 1 and 5, in assembly, the shafts 26 are inserted into the pivot holes 411 of the two first sidewalls 41. The two frames 20 are rotatable relative to the bracket 40 about the shafts 26. The two sliding portions 13 are received into the receiving holes 4531 of the mounting portions 453 and are slidable relative to the mounting portions 453. The two frames 20 are engaged with the two sliding portions 13, and the sliding portions 13 are locked into the recesses 2312 of the latching portions 231. One end of each second resilient member 50 is received in the fixing hole 131 of the corresponding sliding portions 13, and an opposite end is received in the mounting hole 4533.

Each of the two frames 20 is rotatable about the shaft 26 between a first position and a second position. When each of the two frames 20 is located in the first position, the pins 233 are inserted in the bracket 40 via the corresponding through holes 451. When each of the two frames 20 is located in the second position, the pins 233 are located outside of the bracket 40. The first resilient member 60 is deformed when each of the two frames 20 are rotated from the first position to the second position. Each of the two frames 20 is rotated from the second position to the first position when the first resilient member 60 returns.

The handgrip 11 can be driven to slide the sliding portion 13 relative to the mounting portions 453, to rotate each of the two frames 20 from the first position to the second position. The second resilient members 50 are deformed when each of the two frames 20 is located in the first position. Each of the two frames 20 can be rotated from the second position to the first position when the second resilient members 50 return to slide the sliding portion 13. The first resilient member 60 and the second resilient members 50 are capable of preventing each of the two frames 20 from rotating from the first position to the second position.

When the disk drives 100 needs to be secured in the bracket 40, the handgrip 11 is driven to rotate each of the two frames 20 to the second position. The disk drives 100 are inserted into the bracket 40 until the securing holes 101 are aligned with the through holes 451. The handgrip 11 is released, and the first resilient member 60 and the second resilient member 50 returns to rotate each of the two frames 20 from the second position to the first position. The pins 233 are inserted in the securing holes 101 via the through holes 451. Therefore, the disk drives 100 are fixed in the bracket 40.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
   a bracket configured for receiving a disk drive, the bracket comprising two first sidewalls and two second sidewalls, each of the two first sidewalls are connected to the two second sidewalls, and each of the two second sidewalls defines a plurality of through holes;
   a locking member comprising two frames, the two frames are rotatably secured to the two first sidewalls, and each of the two frames comprises a plurality of pins; and
   a first resilient member is connected to the two frames;
   wherein each of the two frames is rotatable between a first position, where the plurality of pins are inserted in the bracket via the plurality of through holes, and a second position, where the plurality of pins are located out of the bracket; and the first resilient member is deformed when each of the two frames is rotated from the first position to the second position, and each of the two frames from the second position to the first position when the first resilient member returns.

2. The mounting apparatus of claim 1, further comprising an operating member, the operating member comprising two sliding portions slidably secured to the two second sidewalls, the two sliding portions engaged with the two frames, and the operating member is capable of rotating the two frames from the second position to the first position by sliding the two sliding portions.

3. The mounting apparatus of claim 2, wherein each of the two sliding portions comprises a hook, each of the two frames comprises a latching portion with a latch, and the hooks of the two sliding portions are engaged in latches of the two frames.

4. The mounting apparatus of claim 2, wherein a second resilient member is connected with one of the two sliding portions and one of the two second sidewalls; and the second resilient member is deformed when each of the two frames is rotated from the first position to the second position, and each of the two frames is rotated from the second position to the first position when the second resilient member returns to slide the one of the two sliding portions.

5. The mounting apparatus of claim 4, wherein each of the two second sidewalls comprises two mounting portions, each of the two mounting portions defines a receiving hole, and the two sliding portions are received in the receiving holes.

6. The mounting apparatus of claim 5, wherein one of the two mounting portions, which is located on the one of the two second sidewalls, defines a mounting hole; one of the two frames, which is adjacent the one of the two second sidewalls, defines a fixing hole; and one end of the second resilient member is received in the mounting hole, and another end of the second resilient member is received in the fixing hole.

7. The mounting apparatus of claim 2, wherein the operating member further comprises a connecting portion and a handgrip, the connecting portion connects with the two sliding portions, and the handgrip extends from the connecting portion.

8. The mounting apparatus of claim 1, wherein each of the two frames is rotatable about a shaft, and the shaft is substantially perpendicular to the two second sidewalls.

9. The mounting apparatus of claim 8, wherein each of the two frames comprises two first levers and two second levers, each of the two first levers connects with the two second levers, and the two second levers are engaged with the shaft.

10. The mounting apparatus of claim 9, wherein the two first levers are substantially parallel to each other and perpendicular to the two second levers, and the two first sidewalls are substantially parallel to each other and perpendicular to the two second sidewalls.

11. A mounting apparatus comprising:
    a bracket configured for receiving a disk drive, the bracket comprising two first sidewalls and two second sidewalls, each of the two first sidewalls connected to the two second sidewalls, and each of the two second sidewalls defining a plurality of through holes;
    a locking member comprising two frames, the two frames are rotatably secured to the two first sidewalls, each of the two frames comprises a plurality of pins, the plurality of pins inserted inside the bracket via the plurality of through holes;
    an operating member engaging with the two frames; and
    a first resilient member connected to the two frames;
    wherein the operating member is operatable to rotate each of the two frames so as to move the plurality of pins out of the bracket and to deform the first resilient member.

12. The mounting apparatus of claim 11, wherein the operating member comprises two sliding portions slidably secured to the two second sidewalls, the two sliding portions are engaged with the two frames.

13. The mounting apparatus of claim 12, wherein each of the two sliding portions comprises a hook, each of the two frames comprises a latching portion, and the hooks of the two sliding portions are engaged with the latching portions of the two frames.

14. The mounting apparatus of claim 12, wherein a second resilient member is connected to one of the two sliding portions and one of the two second sidewalls, for preventing each of the two frames rotating to move the plurality of pins out of the bracket.

15. The mounting apparatus of claim 14, wherein each of the two second sidewalls comprises two mounting portions, each of the two mounting portions defines a receiving hole, and the two sliding portions are received in the receiving holes.

16. The mounting apparatus of claim 15, wherein one of the two mounting portions, which is located on the one of the two second sidewalls, defines a mounting hole; one of the two frames, which is adjacent the one of the two second sidewalls, defines a fixing hole; and one end of the second resilient member is received in the mounting hole, and another end of the second resilient member is received in the fixing hole.

17. The mounting apparatus of claim 12, wherein the operating member further comprises a connecting portion and a handgrip, the connecting portion connects with the two sliding portions, and the handgrip extends from the connecting portion.

18. The mounting apparatus of claim 11, wherein each of the two frames is rotatable about a shaft, and the shaft is substantially perpendicular to the two second sidewalls.

19. The mounting apparatus of claim 18, wherein each of the two frames comprises two first levers and two second levers, each of the two first levers connects with the two second levers, and the two second levers are engaged with the shaft.

20. The mounting apparatus of claim 19, wherein the two first levers are substantially parallel to each other and perpendicular to the two second levers, and the two first sidewalls are substantially parallel to each other and perpendicular to the two second sidewalls.

* * * * *